United States Patent [19]

Quillevere et al.

[11] Patent Number: 5,749,085
[45] Date of Patent: May 5, 1998

[54] ELECTRONIC MEMORY ADDRESSING DEVICE ESPECIALLY FOR A MEMORY ORGANIZED INTO BANKS

[75] Inventors: Claude Quillevere, Plougastel-Daoulas; Frédéric Dufal, Grenoble, both of France

[73] Assignee: France Telecom, France

[21] Appl. No.: 492,591

[22] Filed: Jun. 20, 1995

[30] Foreign Application Priority Data

Jun. 21, 1994 [FR] France .................. 94 07579

[51] Int. Cl.$^6$ .......................... G06F 12/10; G06F 12/02
[52] U.S. Cl. .................. 711/5; 711/1; 711/2; 711/202; 711/220; 711/217
[58] Field of Search .................. 395/401–405, 395/428, 427, 412, 421.07, 421.1; 340/146.3; 382/41

[56] References Cited

U.S. PATENT DOCUMENTS

| | | | |
|---|---|---|---|
| 3,996,559 | 12/1976 | Morrin et al. | 340/146.3 |
| 4,090,174 | 5/1978 | Van Voorhis | 340/146.3 |
| 4,370,732 | 1/1983 | Koggs | 395/405 |
| 4,400,768 | 8/1983 | Christopher | 395/405 |
| 5,173,947 | 12/1992 | Chande et al. | 382/41 |
| 5,269,010 | 12/1993 | MacDonald | 395/405 |

OTHER PUBLICATIONS

Proceedings of the 1985 International Conference On Parallel Processing Aug. 20, 1985, Washington, IEEE Comp. Soc. Press.
Proceedings of the 1985 International Conference on Parallel Processing. Aug. 20, 1985, Washington, IEEE Comp. Soc. Press.

*Primary Examiner*—David K. Moore
*Assistant Examiner*—Than V. Nguyen

[57] ABSTRACT

A first and a second input ports, the sum of whose inputs is greater than an integer n, receive pairs of first words of k bits and of second words of n-k bits, each set of n bits representing an address item (ADI) for a point (PO) of a two-dimensional space of points (IM) associated with data coded on $2^d$ bits, the respective bits of the first and second words representing two coordinates (X, Y) of the point in the said space. A configuration input receives a value of k (k1, k2, k3), chosen to be positive or zero and less than or equal to n, and representative of a geometrical configuration chosen for the two-dimensional[s][pace] space (IM). Addressing means, which can be controlled through the value of k, select the inputs of the first port receiving the k bits of each first word and the inputs of the second port receiving the n–k bits of each second word, and form, from the selected bits, a cell address word of n bits making it possible to address the memory cell of the memory (MM) in which the datum associated with the said point will be stored.

16 Claims, 9 Drawing Sheets

ELECTRONIC MEMORY ADDRESSING DEVICE ESPECIALLY FOR A MEMORY ORGANIZED INTO BANKS

BACKGROUND OF THE INVENTION

The invention relates to the addressing of a memory, especially but not exclusively one organized into banks.

It applies in particular to the addressing of a memory on the basis of a two-dimensional space of points, for example the pixels of a video image, labelled in the said space by coordinates in two directions, and associated with data to be stored in the memory space of the memory.

Currently, the means for addressing a physical memory which is embodied for example on an electronic card, are frozen and adapted for addressing the memory on the basis of a two-dimensional space having a predetermined geometrical configuration, for example a square matrix of points of fixed size.

Now, in numerous-technical domains, and especially in that of video image processing, it proves to be necessary to process two-dimensional spaces having different geometrical configurations, for example image portions with different rectangular shapes. It is then of particular interest to be able to use the same memory space, that is to say the same physical structure, for the purposes of the addressing thereof by a two-dimensional space having different geometrical configurations and therefore potentially an addressing capacity greater than that of the memory space.

This is not possible with the conventional means for addressing a memory.

This problem is even more difficult to solve when the memory is organized into banks, and in particular when it is desired to read or store several data in parallel, for example rows, columns and diagonals of an image, which are stored in different banks.

In fact, in such a case, the address of a point in the two-dimensional space (image) is converted by the addressing means of the memory into a pair of addresses containing the address of one of the banks of the memory and the address of one of the memory cells of the said bank. This conversion law must be injective, that is to say that to two different originating addresses there must correspond two different pairs.

The way of organizing the layout of the data in a memory organized into banks so as to be able in particular to make provision for arranging, in different banks, the data to which simultaneous access is required, is a special technique of memory organization commonly termed "skewing" by those skilled in the art. Such a technique is, in particular, mentioned in the article by Shapiro, Theoretical Limitations on the Efficient Use of Parallel memories, IEEE Transactions on Computers, Vol C 27, no. 5, May 1978, pages 421–428, and in the article by Wijshoff & Leewen in The Structure of Periodic Storage Schemes for Parallel Memories, IEEE Transactions on Computers, Vol C-34 No. 6, June 1985, pages 501–504.

Now, this technique of "skewing" and, consequently the structure of the addressing means conventionally used to implement such a technique, rests on the principal that the shape of the two-dimensional space of points, for example an image, is frozen at the time of the physical embodying of the memory by "skewing". It is not therefore possible to use the same physical structure on the basis of a two-dimensional space of points which may exhibit different geometrical configurations. Indeed, if such an attempt were made, that is to say if the meaning of the addressing bits delivered to the addressing means of the memory were modified, there would no longer be any certainty of preserving the injectivity of the conversion law and neither would there be any certainty that it would be possible to avoid conflicts of access to the memory while delivering data, which, for a fixed geometrical configuration, would indeed appear in distinct banks, but which through a change of geometrical configuration of the image, now appear in the same bank.

SUMMARY OF THE INVENTION

The invention aims to afford a solution to these problems.

An object of the invention is to be able to address one memory space of a memory on the basis of a two-dimensional space with different geometrical configurations and therefore potentially exhibiting an addressing capacity greater than that of the memory space.

The object of the invention is also to allow parameterization of the shape of the two-dimensional space of points.

The object of the invention is also to allow such a parameterization in the case of a memory organized into banks.

One of the objects of the invention is also, with one and the same physical structure, to be able to configure the memory space in a different way, that is to say to be able to store therein data coded on different numbers of bits.

The invention also makes it possible readily to partition the physical structure into several independent memory blocks, thus making it possible to access different patterns of points in the two-dimensional space of points.

The subject of the invention is therefore an electronic memory addressing device, for a memory containing a useful memory space of M bits which can be configured as two $2^n$ memory cells of D bits (in a particular case, M is equal to $2^m$ and D is equal to $2^d$, n and d being positive integers or zero with sum equal to m), each memory cell being addressable by a cell address word of n bits; the device comprises input means including a first input port of $q_1$ inputs and a second input port of $q_2$ inputs, the sum $_1q+_2q$ being greater than n, for receiving pairs of first words of k bits and of second words of n–k bits; each set of n bits represents an address item of a point of a two-dimensional space of points associated with data coded on D bits, the respective bits of the first and second words representing two coordinates of the point in the said space; the device also comprises a configuration input for receiving a value of k, chosen to be positive or zero and less than or equal to n, and representative of a geometrical configuration chosen for the two-dimensional space; also provided are addressing means, which can be controlled through the value of k, and including selection means for selecting the inputs of the first port receiving the k bits of each first word and the inputs of the second port receiving the n–k bits of each second word, as well as address generation means for forming, from the selected bits, a cell address word of n bits making it possible to address the memory cell in which the datum associated with the said point will be stored; the same useful memory space can thus be addressed on the basis of a two-dimensional space with different geometrical configurations.

Stated otherwise, when the addressing of the memory space is performed on n bits, the invention makes it possible to be able to apportion these n addressing bits freely between the two coordinates of each point. The memory space can thus be addressed by all the points situated on the abscissa axis, (for example) of the image, this corresponding to addresses of points, the abscissae of which are coded on n bits and the ordinates on 0 bits, or indeed all the points of the ordinate axis (ordinates of the points coded on n bits and abscissae on 0 bits), or indeed of the points contained in a rectangle, all the points of which have an address along the ordinate axis, coded on a number of bits less than or equal to k and an address, along the abscissa axis, coded on a number of bits less than or equal to n–k.

The device according to the invention finds a particularly advantageous application in the case of the memory organized into banks, whose useful memory space includes for example at least $2^b$ banks of M bits ($M=2^m$ with m=n+d, in a special case), with b greater than or equal to 1. According to one embodiment of the invention, the sum of the inputs of the two ports is chosen to be greater than the sum s equal to n+b while k is chosen to be greater than or equal to b and less than or equal to s–b. The addressing means are then able to convert, according to a predetermined injective conversion law, each address item of a point into a memory address word including a cell address word and a bank address word representing, in the memory space, the address of the bank containing the said cell. For this purpose the addressing means comprise selection means capable, in the presence of address item words of $s_1$ bits, with $s_1=s$, of selecting the inputs of the first port receiving the k bits of each first word and the $s_1$–k bits of each second word in order to form an intermediate word of $s_1$ bits, and generation means capable of forming from the $s_1$ bits of the intermediate word, the cell address word of $n_1$ bits with $n_1=n$ and the bank address word of at least b bits.

Thus for example, in the case where the memory includes 16 banks with addressing on 15 bits (n=11 and b=4) the total number of inputs of the two ports is at least equal to 16 while k is chosen to be greater than or equal to 4 and less than or equal to 11. The address item words then include 15 bits, as does the intermediate word, while each cell address word includes 11 bits and the bank address word 4 bits.

If m, which is equal to n+d, is chosen equal to 15, it is possible to store, in each memory cell of the memory space, data words of 16 bits ($2^4$ bits).

Nevertheless, it may prove to be of benefit to configure the memory space in such a way as to store not $2^n$ words of 16 bits but $^{n-1}2$ words of 32 bits. In this case, the address item words of the points delivered to the device according to the invention, will include useful addressing bits in a number $s_1$ less than s. And, it is on this number $s_1$ of bits that the selection means will advantageously operate in order to form the intermediate word from which the cell address words and corresponding address words will be formed.

More generally, according to one embodiment of the invention, the selection means are capable, in the presence of address item words of $s_1$ bits, with $s_1=s-d_o$ bits, assigned to points whose corresponding data are coded on $2^{d+d_o}$ bits, of selecting the inputs of the first port receiving the k–$d_o$ first bits of each first word and the $s_1$–k+do first bits of each second word to form the intermediate word of $s_1$ bits, the generation means forming, from the $s_1$ bits of the intermediate word, the cell address word of $n_1$ bits, with $n_1=n-d_o$, and the bank address word of at least b bits.

In fact, the invention also makes it possible to combine the two possibilities mentioned above. For this purpose, there is provision for generating an intermediate word of s bits and for using it fully in the first case mentioned above (addressing on s bits) or indeed partially (addressing on $s_1$ bits).

According to one embodiment of the invention, each input port includes $s_1$–b inputs and the selection means then select at least the first b bits of each of the first and second words, irrespective of the value of k, to form the intermediate word.

The generation means advantageously generate the cell address word from the first b bits of one of the first and second words, and from the other $n_1$–b bits selected by the selection means and differing from the first b bits of the other of the first and second words.

The generation means can determine the bank address word from a linear relation modulo p between the two coordinates of the point, where p denotes the number of banks of the memory. This number of banks can be equal to $2^b$. The generation means then determine the bank address word of b bits from the first bits of each of the first and second words.

The number of words can also be equal to a prime number greater than $2^b$. For example, when b is equal to 4, p is advantageously chosen equal to 17. In this case, the bank address words would include words of 5 bits.

When the number of banks is equal to $2^b$, the selection means are furthermore advantageously capable of substituting at least the highest addressing bit of one of the first and second words by the $b^{th}$ bit of the other of the first and second words to form the intermediate word of $s_1$ bits, and the generation means then force the highest-order addressing bit of the bank [addresss] address word obtained to a predetermined value, this making it possible to partition the memory space into several independent memory blocks, here for example into two memory blocks of two $2^{b-1}$ banks each, while preserving, within each of the memory blocks, the injectivity of the predetermined conversion law.

In the case where it is desired simultaneously to access data stored in distinct banks, the input means of the device advantageously include $2^b$ pairs of input ports intended for receiving respectively and simultaneously $2^b$ chosen address items corresponding to $2^b$ distinct bank address words bearing in mind the predetermined infective conversion law. The device according to the invention can then, via its hardware structure, convert each of the $2^b$ address items delivered into $2^b$ distinct bank address words and into $2^b$ cell address words making it possible to identify the location of the corresponding memory cells.

BRIEF DESCRIPTION OF THE DRAWINGS

Other advantages and characteristics of the invention will emerge on examining the detailed description of several entirely non-limiting embodiments, and the attached drawings in which.

DETAILED DESCRIPTION OF THE INVENTION

Figure 1:
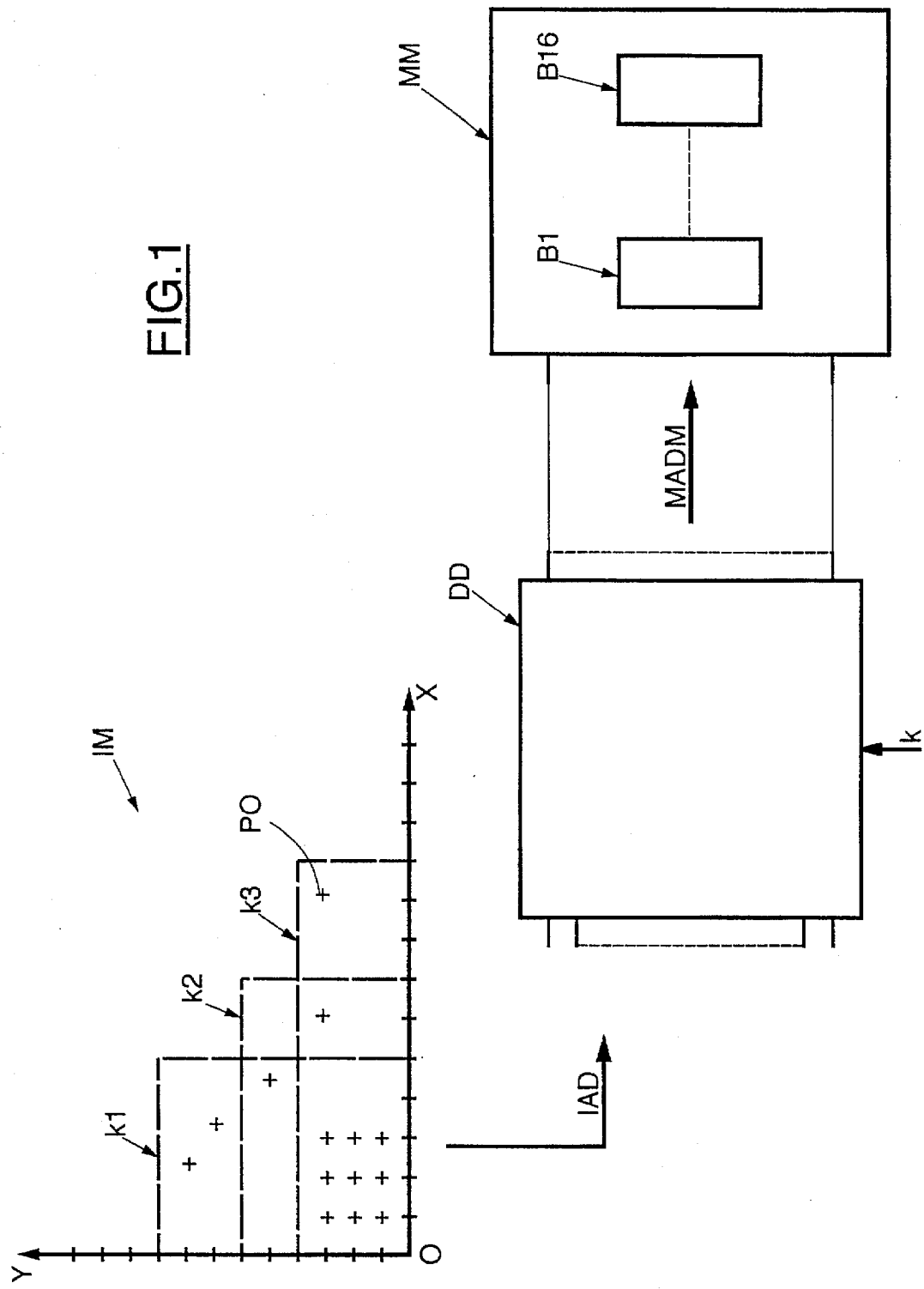
FIG. 1 is a schematic overview of a device according to the invention, linked to a memory which can be addressed on the basis of a two-dimensional space of points.

Although the invention is not limited thereto, various embodiments of a device according to the invention will now be described, applicable to a memory MM 100 such as illustrated in FIG. 1, organized into banks. It will be recalled that the banks of a memory are independent physical memory blocks.

In FIG. 1, the memory space of the memory (MM) 100 includes $2^b$ banks B1-B16 81-96, b being equal to 4. Each bank includes a useful memory space of $2^m$ bits configurable into $2^n$ memory cells of $2^d$ bits; n and d are positive integers of zero with sum equal to m. Each memory cell is addressable by a cell address word of n bits. In the particular case which will be described below, each bank will be configurable into $2^n$ memory cells of 16 bits or indeed into $2^{n-1}$ memory cells of 32 bits. In the first case, the memory will allow the storage of data coded on 16 bits, and on 32 bits in the second case.

The addressing of the memory (MM) 100 is performed by way of a memory address word (MADW) 105 of s bits, it being possible for s to be equal to n+b in the case where the data to be stored are coded on 16 bits, or indeed equal to n+b−1 in the case where the data are coded on 32 bits.

In fact, as will be seen in more detail later, the memory address word (MADW) 105 is broken down into a bank address word representing, in the memory space, the address of a bank and, a cell address word representing the address of a memory cell in the said bank.

This memory address word (MADW) 105 is delivered by the device (DD) 106 according to the invention from an address item word (ADI) 108 received as input and making it possible to label a point PO 110 in a two-dimensional space of points [IM], such as a video image, a video image portion or any other type of data which the user of the memory will have been able to structure into two dimensions.

An address item is a word of s bits, k bits of which represent one of the coordinates of the point in the image, for example the ordinate, whilst the other s−k bits represent another coordinate of this point in the two-dimensional space, for example the abscissa. According to the various values of k (k1 114, k2 116, k3 118), it is therefore seen that different geometrical configurations are defined for the image.

The conventional addressing devices for a two-dimensional memory are frozen and adapted to a predetermined geometrical configuration, for example the configuration k2 116. It is then not therefore possible to address the memory with points situated outside the domain defined by k2 116.

The invention on the contrary permits this and it is in this sense that we speak of an addressing capacity of the two-dimensional space of points, which is greater than that of the useful memory space, it being understood of course that the maximum addressing capacity of each domain defined by the value k is identical and at most equal to that of the memory space of the memory.

Figure 2:
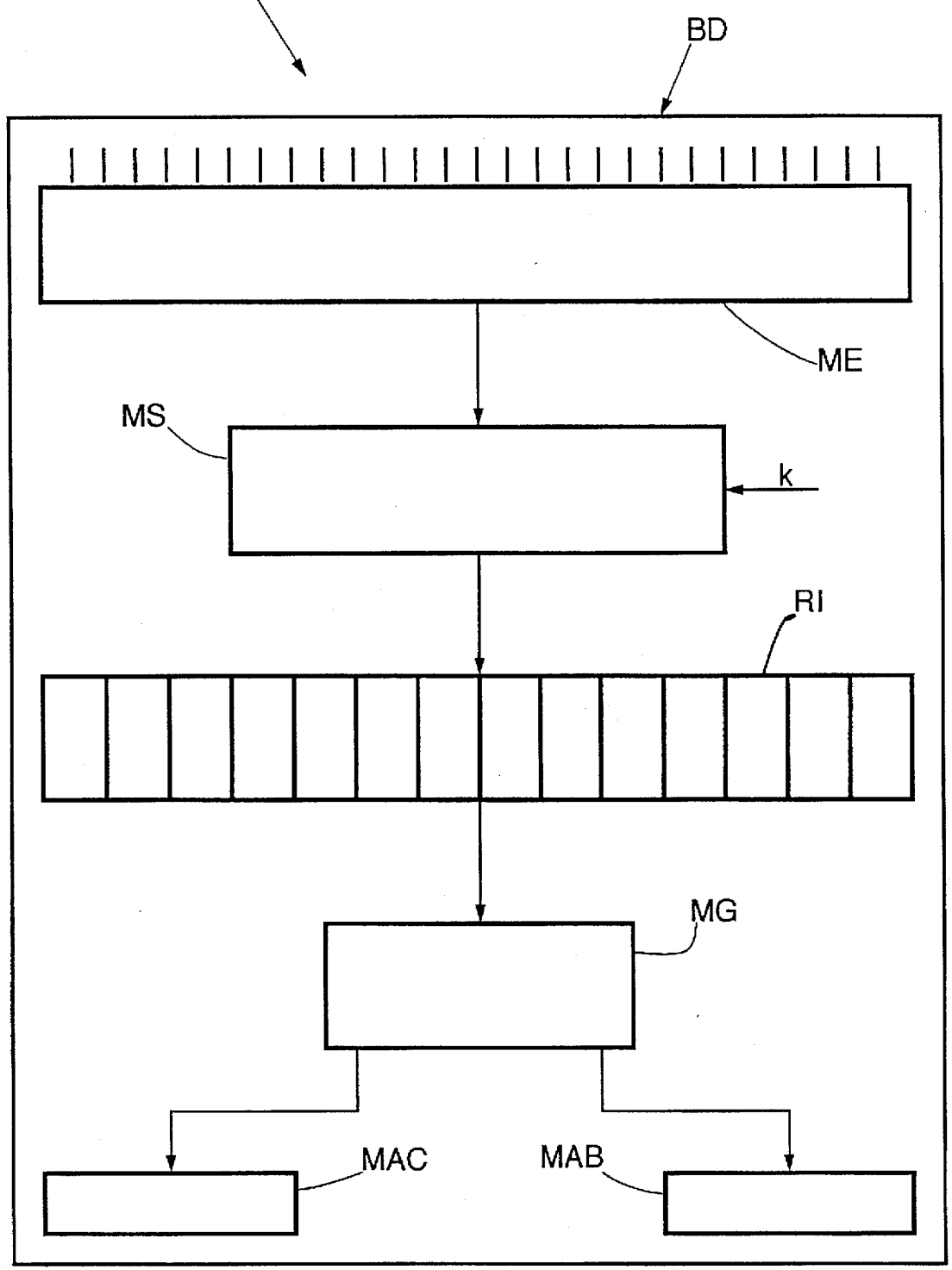
FIG. 2 is a more detailed schematic representation of the device of FIG. 1.

Such as illustrated in FIG. 2, the device (DD) 106 comprises at least one block (BD) 120 including input means (ME) 122 having a number of inputs greater than the number of bits of the address item, that is to say greater than s. The input means therefore receive first words of k bits and the second words of s−k bits, which together form the address item for the various points. The device also possesses a configuration input CPI 123 in selection means (MS) 124 for receiving a chosen value of k, in the general case positive or zero and less than or equal to s. This value of k is therefore representative of the geometrical configuration chosen for the two-dimensional space.

The addressing means of [BD] device (DD) 106 are controlled by the value of k and include selection means (MS) 124 for selecting the inputs of the input means receiving the k bits of each first word and the inputs receiving the s−k bits of each second word, and thus forming an intermediate word of s bits in a register (RI) 126. Generation means (MG) 128 then form, from the s bits of the intermediate word, a bank address word (BAW) 130 of b bits representing the address of the bank in the memory space of the memory as well as a cell address word (CAW) 132 of n bits making it possible to address the memory cell in which the datum associated with the relevant point will be stored.

Of course, in the case where the memory was not organized into banks, the intermediate word of s bits would by itself form the cell address word making it possible to address the memory cell in which the datum associated with the relevant point will be stored. Furthermore, the use of a register (RI) 126 is not indispensable, it being possible for the latter quite simply to be an internal bus.

Figure 3:
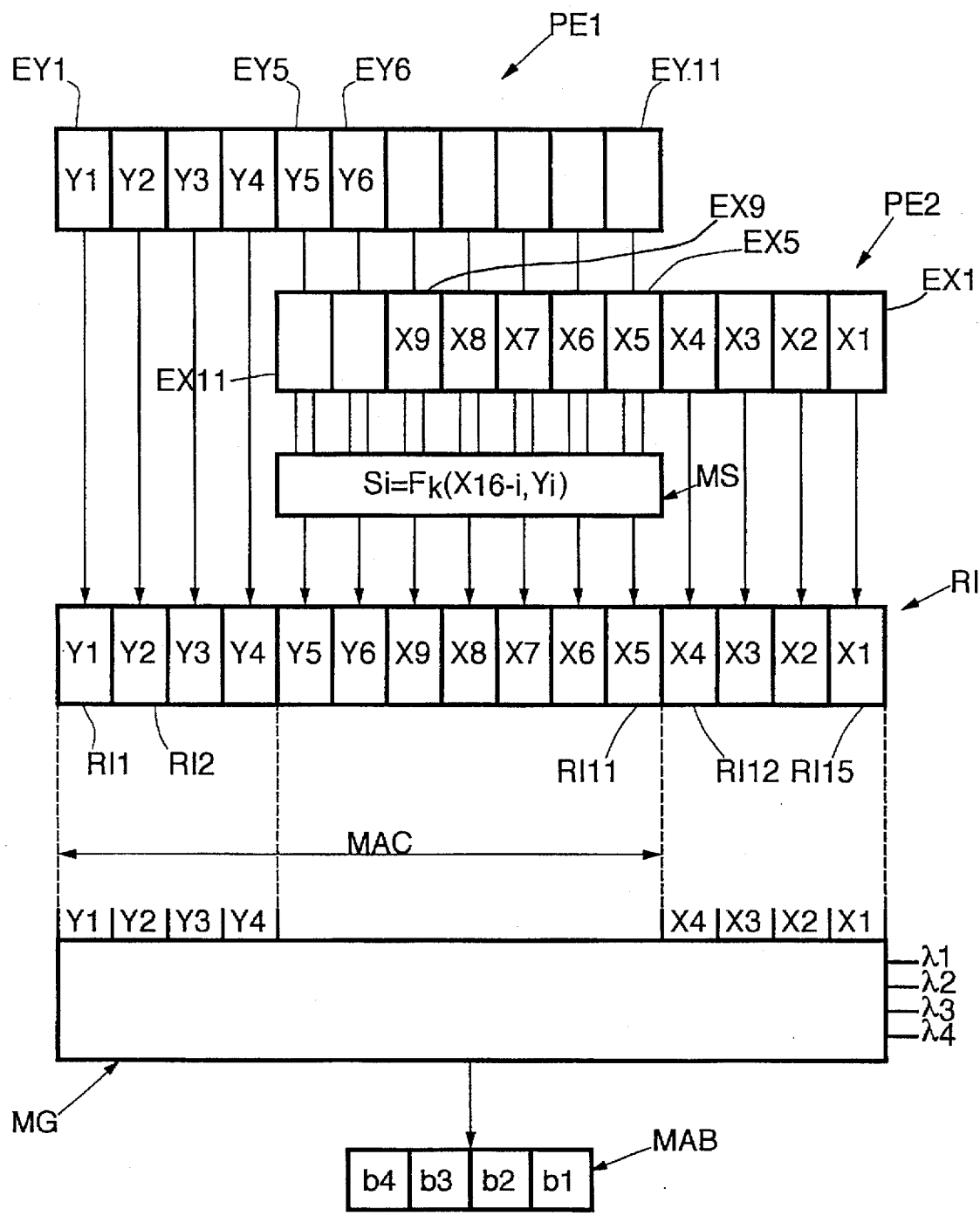
FIG. 3 is a still more detailed overview representation of the device of FIG. 1.

It is now assumed, in the embodiment illustrated in FIG. 3, that the word representative of each address item word (ADI) 108 received as input of the device (DD) 106 is a word of s=15 bits. Each of the 16 banks of the memory is addressable by a bank address word (BAW) 130 of 4 bits and each bank has a useful capacity of $2^m$ bits configurable into $2^n$ memory cells addressable by cell address words (CAW) 132 of n bits with n=11, making it possible to store data coded on 16 bits (d=4).

k is then chosen greater than or equal to b and less than or equal to s−b, that is to say in this instance greater than or equal to 4 and less than or equal to 11. The input means include two input ports PE1 140, PE2 142 each having s−b inputs, that is to say 11 inputs, EY1−EY11 151−161 and EX1−EX11 171−181.

Of course, in a general way all the inputs of each port are wired in such a way as to be capable of receiving the bits of the first and second words in a number corresponding to the geometrical configuration chosen for the two-dimensional space.

The inputs EY1 151 to EYk of the first input port PE1 140 receive the k bits of the first word forming the address item word (ADI) 108, these k bits being ordered such that the low-order bit Y1 is received on the input EY1 151 and the high-order bit Yk is received on the input EYk.

Similarly, the s−k bits of the second word are received on the inputs EX1 171 to EXs−k respectively.

The selection means (MS) 124 select the inputs of the first port PE1 140 receiving the k bits of each word and the inputs of the second port PE2 142 receiving the s−k bits of the second word. Since k is chosen greater than or equal to b and less than or equal to s−b, the first b bits Y1−Y4 of each first word are stored directly in the intermediate register (RI) 126 intended for receiving the intermediate word of s bits, as are the first b bits X1−X4 of each second word.

In the present case, the selection means (MS) 124 are therefore composed essentially of a block [MS] connected to the inputs EX5−EX11 175−181 of the second port, and to the inputs EY5−EY11 155−161 of the first port, and capable of performing on the bits received on these inputs the function Fk(X16−i, Yi) in order to deliver to the intermediate register (RI) 126, 7 bits S5−S11. According to this function, the bit Si equals Yi if i is less than or equal to k, and it equals X16−i if i is greater than k.

Figure 4:
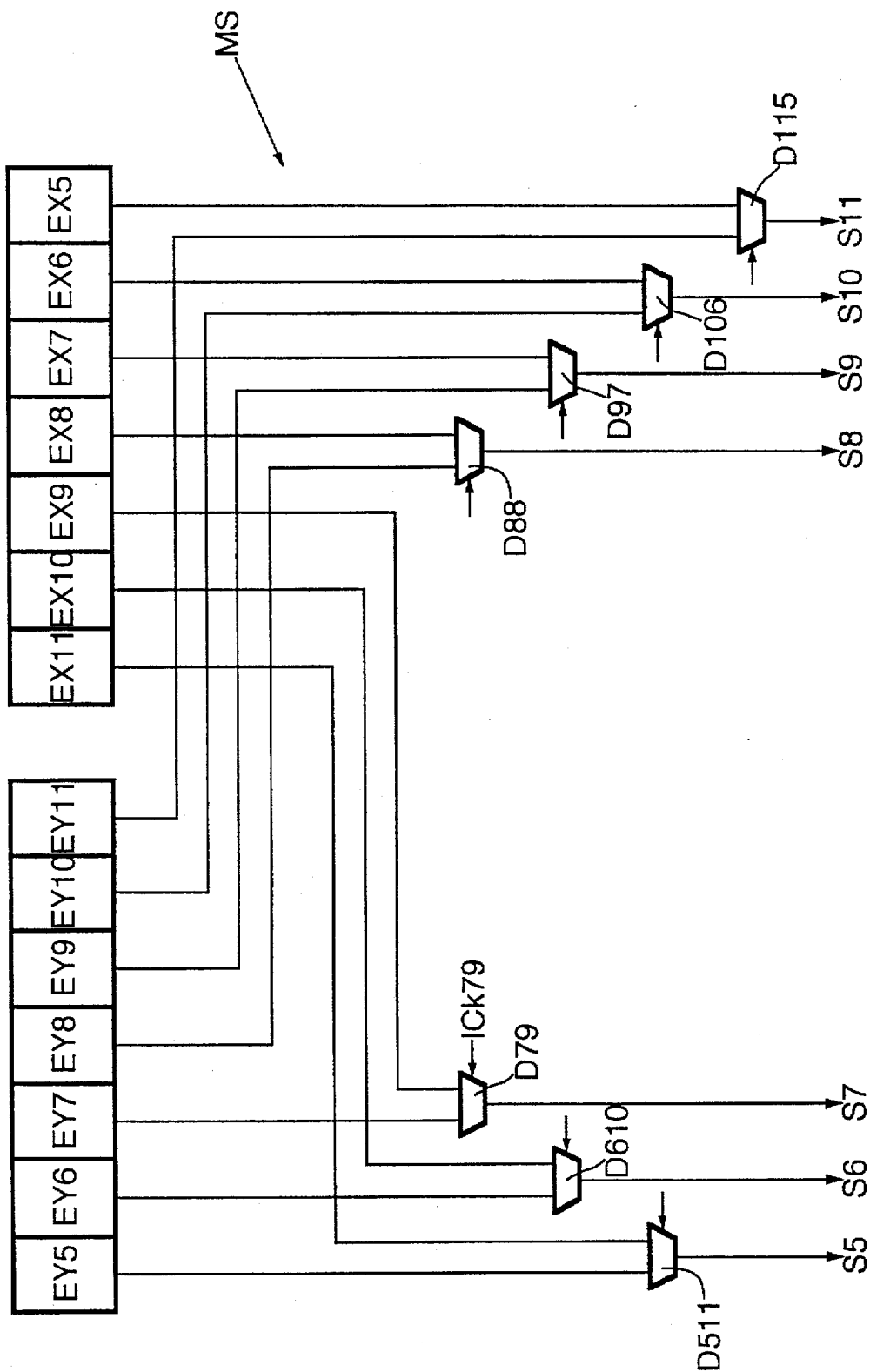
FIG. 4 is a more detailed representation of a part of [figure] FIG. 3.

Although the selection means (MS) 124 can be embodied in various ways, it has been deemed preferable, for reasons of simplicity of production, to adopt the embodiment illustrated in FIG. 4. The selection means (MS) 124 here include a plurality of duplexers.

One of the inputs of each duplexer is connected to one of the inputs of the first input port whilst the other input of the said duplexer is connected to an input of the second input port. Thus, the duplexer D511 200 is connected to the inputs EY5 155 and EX11 181 in order to deliver as output the bit S5 201, the duplexer D610 202 is connected to the outputs EY6 156 and EX10 180 to deliver the bit S6 203, the duplexer D79 204 is connected to the inputs EY7 157 and EX9 179 to deliver the bit S7 205, the duplexer D88 206 is connected to inputs EY8 158 and EX8 178 to deliver the bit S8 207, the duplexer D97 208 to the inputs EY9 159 and EX7 177 to deliver the bit S9 209, the duplexer D106 210 to the inputs EY10O 160 and EX6 176 to deliver the bit S10 211 and the duplexer D115 212 to the inputs EY11 161 and EX5 175 deliver the bit S11 213.

In a general way, the inputs of each port are ordered so as to receive respectively the bits of the corresponding word, ranked from the low-order bit up to the high-order bit. Thus, the input EY5 155 of rank 5 is intended to receive, possibly, the bit Y5 of rank 5 of the first word, whilst the input EY11 161 of rank 11 is intended to receive, possibly, the eleventh bit of the first word. Similarly, the input EX5 175 of the second port, of rank 5, is intended to receive, possibly, the fifth bit of the second word and the input EX11 181, possibly, the eleventh bit of the second word. Also, in general, the sum of the ranks of all the pairs of inputs of the two ports to which the duplexers are linked is constant and here equal to 16.

Each duplexer Duv, connected to the inputs EYu and EXv, is controlled via a control item [Ickuv] CPIkuv represented in FIG. 4 with CPIk79 218, depending on the value of k, in such a way as to connect to the corresponding slot of the intermediate register (RI) 126, either the input EYu or the input EXv.

The addressing means then include control means capable of delivering, from the value of k, each numerical control item [Ickuv] CPIkuv. More precisely, according to an example embodiment if u=i and v=16–i, the control item [Ickuv] CPIku is a control bit which equals 1 if i≦k (input EYu connected to the register slot) and 0 if i>k (input EXv connected to the register slot); this control bit can be obtained from a binary coding of k, or indeed through a unary coding of k in the form of 16–k zeros and k ones.

The action, in a general way, of "reversing" the bits of one of the words, in this instance the second word, with respect to the other word, as may be seen in FIG. 3, that is to say the action of coupling, via duplexers, inputs of ports, the sum of the ranks of which is constant, makes it possible very simply to carry out the flexible addressing according to the invention and essentially to use duplexers only.

Returning now to FIG. 3 wherein it has been assumed, by way of example, that k was equal to 6. Stated otherwise, the 6 bits Yi of the first word are the six bits Y1 to Y6 and are delivered to the inputs EY1–EY6 151–156 respectively, whilst the 9 bits Xi of the second word, namely the bits X1–X9, are delivered to the inputs EX1–EX9 171–179 respectively of the second port. It is therefore noted that the inputs EY7–EY11 157–161 of the first port PE1 140 and the inputs EX10 180 and EX11 181 of the second port do not receive any bit. The selection means MS therefore select the inputs EY5 155, EY6 156, EX9 179, EX8 178, EX7 177, EX6 176 and EX5 175 in order to deliver respectively to the intermediate register RI 126 the bits S5–S11 which are equal respectively to Y5, Y6, X9, X8, X7, X6, X5.

In general, the generation means (MG) 128 determine the cell address word (CAW) 132 of n (=11) bits from the first b bits of one of the first and second words and from the other n–b bits selected by the selection means (MS) 124 and differing from the first bits of the other of the first and second words. Specifically, in the present case, the cell address word (CAW) 132 is obtained from the first b bits Y1–Y4 of each first word and from the other seven bits selected by the selection means (MS) 124 with the exception of the first b bits X1–X4 of the second word, namely the bits Y5, Y6, X9–X5.

In fact, the structure of the generation means (MG) 128 of the cell address word amounts here to a simple linking of the corresponding part of the intermediate register (RI) 126 with the addressing port of the memory.

To obtain the b bits of the bank address word (BAW) 130, it is appropriate to choose a function which preserves the infectivity of the address conversion law. It will for example be possible to opt for a linear relation modulo $2^b$ (that is to say a periodic linear relation of period $2^b$) between the two coordinates of the relevant point. Specifically, the address word (BAW) 130 is here of the form $a_1 X + \lambda Y$ [16] with $a_1$ odd, the notation [] signifying "modulo". In the present case, if $a_1$ is taken equal to 1, one bit bi of the bank address word is calculated solely from Xi, Yi and $\lambda i$ with $1 \leq i \leq 4$.

Figure 5:
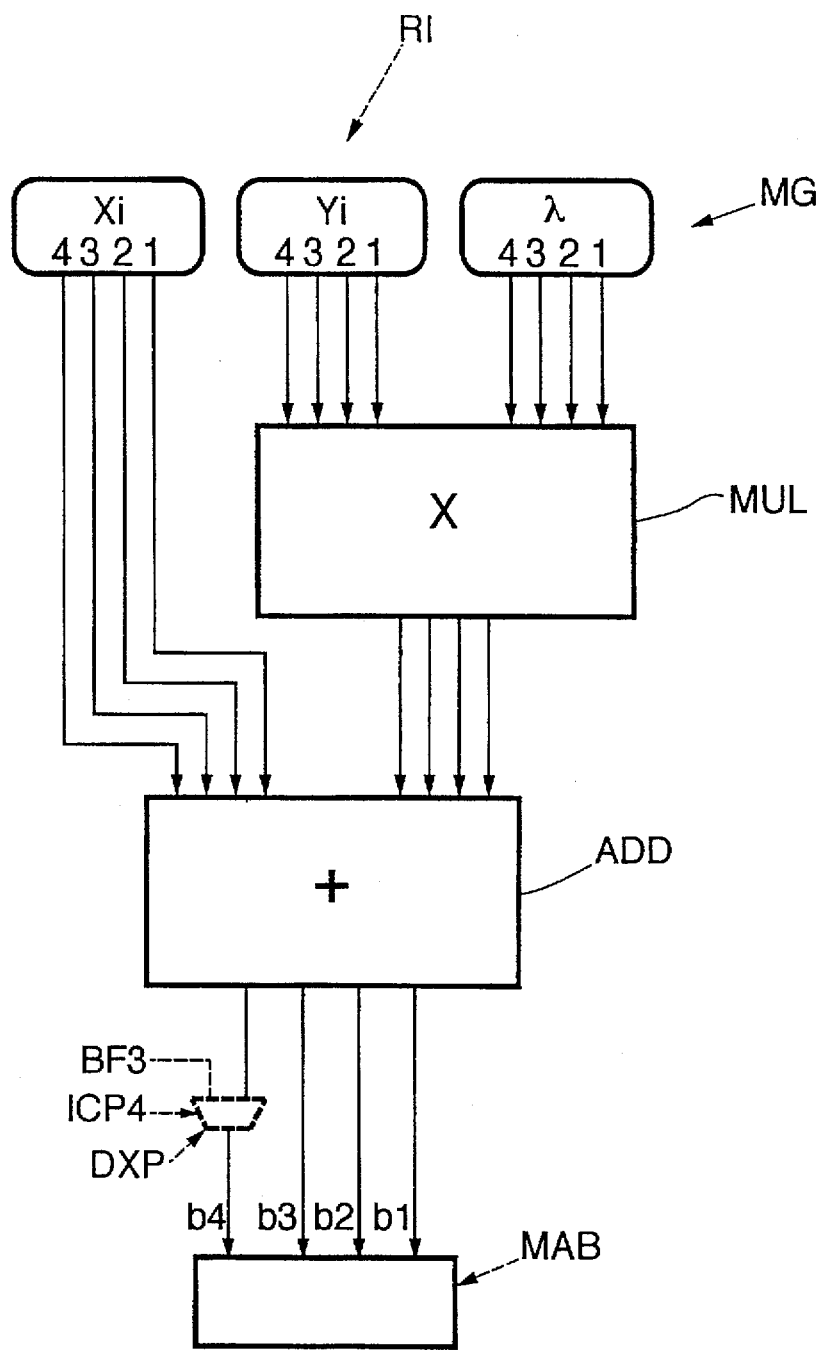
FIG. 5 illustrates in a more detailed manner another part of the device of FIG. 2, FIGS. 6 to 8 illustrate three other embodiments of the device according to the invention.

As illustrated in FIG. 5, the generation means (MG) 128 then include a multiplier MUL 220 receiving as input the first b (four) bits Yi of the first word as well as the four bits of the parameter $\lambda$. The output of the multiplier MUL 220 is connected to one of the inputs of an adder ADD 222 receiving on its other input the first b bits Xi of the second word. The output of the adder supplies the four bits b1–b4 of the relevant bank address word (BAW) 130. In certain cases detailed below, it may prove to be of benefit to force the high-order bit of the bank access word (BAW) 130 to a predetermined value BF3 132. This is performed with the aid of a duplexer DXP 134 controlled by a control item [CPI] CPI4 254.

Figure 6:
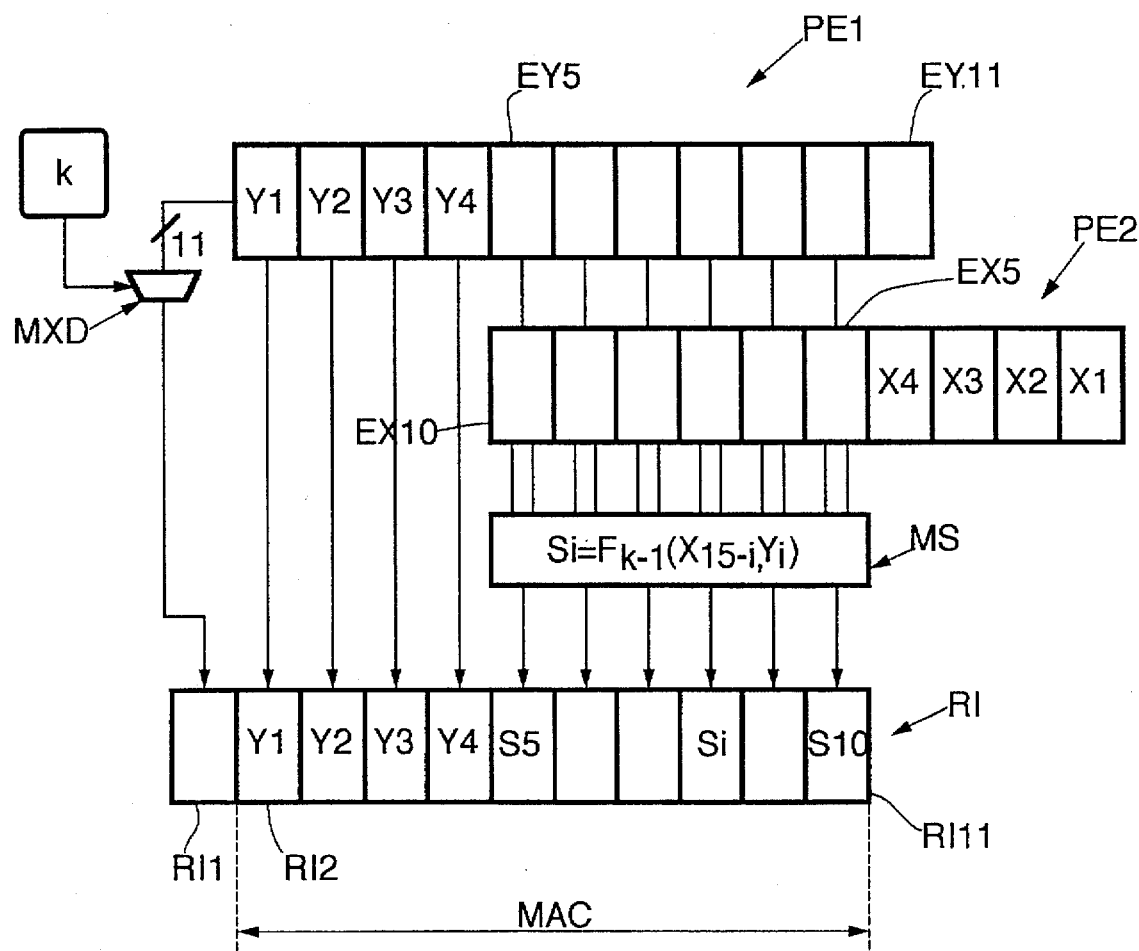

FIG. 6 illustrates one embodiment of the invention making it possible to adapt likewise to a memory, each memory cell of which is now adapted for storing data coded on 32 bits and is consequently addressable by a cell address word of n–1 bits (in this figure it is assumed that k will be chosen greater than or equal to 5).

For simplifying purposes, in FIG. 6 only that part of the intermediate register (RI) 126 intended to contain the cell address word (CAW) 132 has been represented. The means for generating the bank address word are not represented and determine the corresponding bank address word in the same way as explained with reference to FIG. 5.

In theory, in the case where it is not desired to modify the configuration of the memory from one application to another, and since the address item word (ADI) 108 corresponding to a point of the image is now coded on $s_1 = s - 1$ bits, the inputs EX11 181 and EY11 161 of the input ports PE2 142 and PE1 140 are not useful, like the multiplexer MXD 230. The selection means (MS) 124 then anyway select the first b bits Y1–Y4 of the first word and six other bits S5–S10 determined by the relation $F_{k=1}(X15-i, Yi)$. For this purpose, the duplexers which carry out this function are connected to the inputs EY5–EY10 151–160 and EX5–EX10 175–180.

The cell address words (CAW) 132 therefore include the bits Y1–Y4 and S5–S10.

Nevertheless, the embodiment of FIG. 6 in its complete structure, makes it possible to adapt to a possible change of configuration of the memory [space] (MM) 100. Indeed, there is provided a multiplexer MXD 230 linked to the eleven inputs of the first input port and controlled by the value of k in order to deliver to the first slot RI1 of the register (RI) 126 the highest addressing bit Yk of the first word. This first slot RI1 then corresponds to a predetermined position of the cell address word (CAW) 132, namely here the highest-order bit.

In the case where the configuration of the memory provides for the storage of data on 32 bits, the addressing port of the memory will use an addressing word (CAW) 132 of 10 bits, ignoring the highest-order bit of the intermediate word. By contrast, in the case where the memory is configured to store data of 16 bits, storage of the highest addressing bit Yk of the first word will make it possible to retrieve a cell address word (CAW) 132 of 11 bits.

It may also prove to be of benefit in certain applications to partition the memory space into two independent-memory blocks each having $2^{b-1}$ banks, that is to say in this instance 8 banks. The embodiment illustrated in FIG. 7 offers such a possibility (in combination with the duplexer DXP 134 (FIG. 5)).

Here it is assumed that the addressing is performed on s bits (15 bits). This embodiment differs from that illustrated in FIG. 6 through the fact that there is provided a [duplexer] multiplexer MXP 232 controlled by a control item CPI 136 receiving on the one hand as input the highest addressing bit Yk of the first word and on the other hand the $b^{th}$ bit X4 of the second word. In the case where it is desired to partition the memory, the selection means (MS) 124 substitute the highest addressing bit Yk of the first word (of course it would also have been possible to provide for substituting the highest addressing bit Xs–k of the second word) by the bit X4. If it is not desired to partition the memory, the bit Yk is then stored in the intermediate register and a situation is encountered which is similar to that illustrated in FIG. 3, or in FIG. 6 with addressing on s bits.

Furthermore, in the case of a partitioning of the memory, the high-order bit b4 of the bank address word (BAW) 130 is replaced by a bit of predetermined value BF3, as shown in FIG. 5.

The reason why the bit X4 has been substituted for the bit Yk in the cell address word (CAW) 132 is to maintain the injectivity of the conversion law (although the bit b4 of the bank address word has been "overwritten" by the bit BF3). This infectivity is recovered since the "bit overwritten" in bank address word (BAW) 130 is henceforth to be found in cell address word (CAW) 132.

Of course, in the case where it is desired to partition the memory into more than two independent blocks, it is appropriate to substitute the highest addressing bits of the first or of the second word by as many bits chosen from the first b bits of the second or of the first word, respectively.

Figure 8:
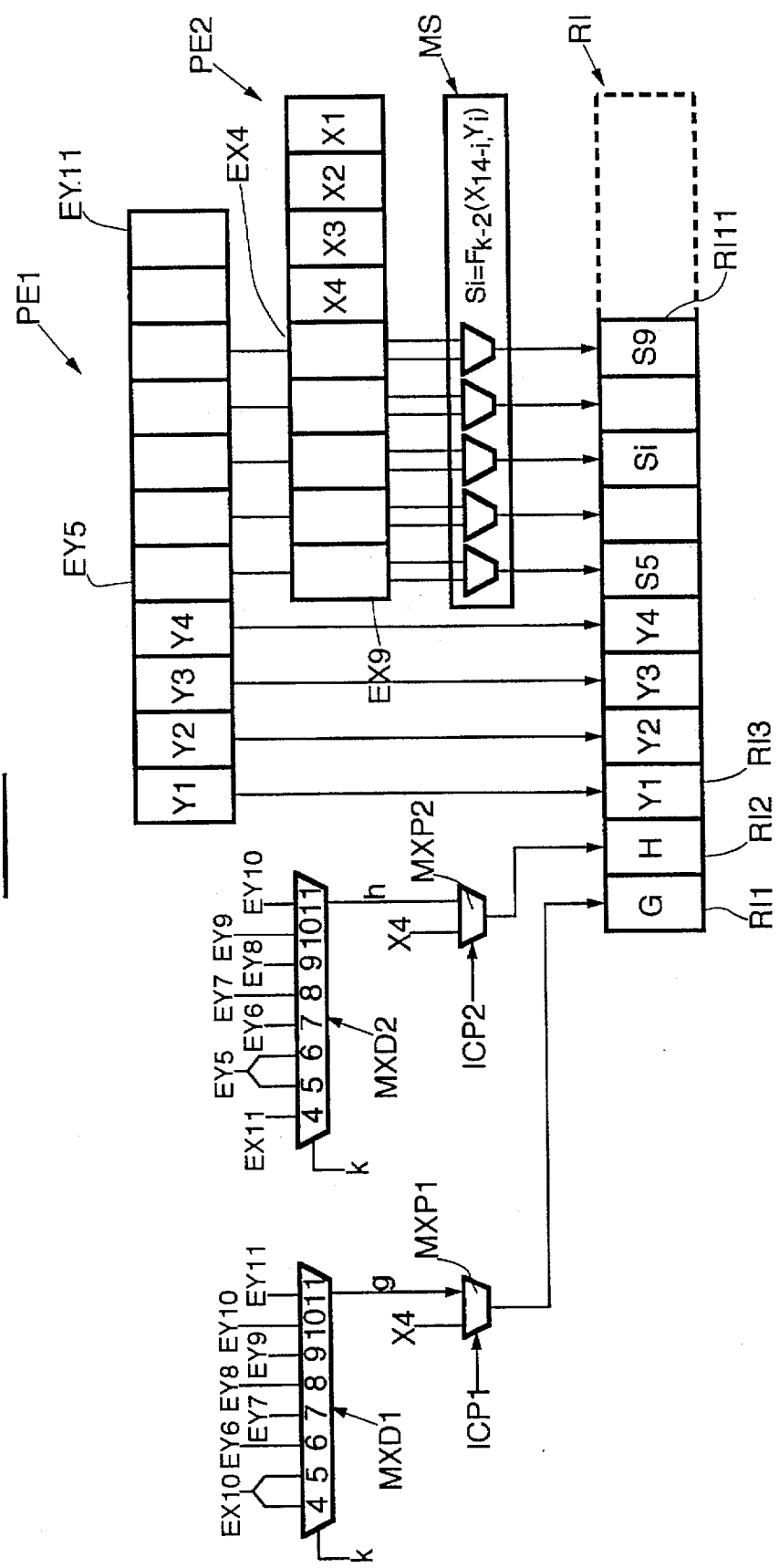

The embodiment illustrated in FIG. 8 makes it possible to address the memory, as a matter of choice with data words of 16 bits without partition, or with words of 16 bits with partition, or with data words of 32 bits without partition, or with words of 32 bits with partition, while offering the possibility, by parameterizing the value of k, of modifying the geometrical configuration of the image.

The two input ports PE1 140 and PE2 142 include s–b inputs (15–4=11 inputs). The duplexers in selection means (MS) 124 controlled by the value of k determine the bits Si of the intermediate word according to the relation $F_{k-2}$ (X14–i, Yi) (that is to say Si=Yi if i is less than or equal to k–2 and X14–i otherwise, with k varying from 4 to 11 and i from 5 to 8). They are connected respectively to the inputs of the first port of ranks b+1 to s–b–2 (inputs EY5–EY9 155–159) and to the inputs of the second port PE2 142 of ranks s–b–2 to b+1 (EX9 179 to EX5 175). The selection means include for example a multiplexer MXD1 231 controlled by the value of k, linked to the inputs EX10 180 and [EY 6] EY6 156 to EY11 161 and another multiplexer MXD2 233, likewise controlled by the value of k, connected to the inputs EX11 181 and EY5 155 to EY10 160.

Another [duplexer] multiplexer MXP1 234 receives as input the $b^{th}$ bit X4 of the second word as well as the bit g delivered by the multiplexer MXD1 231 whilst another [duplexer] multiplexer MXP2 235 also receives as input the $b^{th}$ bit X4 of the second word and the bit h delivered by the multiplexer MXP2 235.

The output of the multiplexer MXP1 234 is connected to the first slot RI1 of the register (RI) 126 corresponding to the highest-order bit in respect of the cell address word (CAW) 132 of n(=11) bits. The output of the [duplexer] multiplexer MXP2 235 is connected to the next slot RI2 of the intermediate register.

In the case where it is not desired to perform any partition of the memory, the bits G and H respectively take the values g and h, depending on the value of k chosen. If the memory is configured to store words of 16 bits the cell address word (CAW) 132 will include the n bits g to S9. By contrast, if the memory is configured to store the data of 32 bits, the bit G of highest order will be ignored and the cell address word will include n–1 bits from H to S9.

In the case of a partitioning of the memory with data coded on 16 bits, one of the bits G and H will be replaced by the bit X4. In the case of a partitioning with data words of 32 bits, the bit H will take the value X3 whilst the bit G will be ignored in the cell address word CAW 132.

Apart from the configuration input making it possible to choose the value of k, the device also comprises control inputs for memory partitioning and for memory space configuration making it possible to receive, from the user in particular, the corresponding memory configuration state items. The control means are then able, in a conventional manner readily executable by those skilled in the art, to formulate the miscellaneous control items CPI 136, CPI1 250, CPI2 252, CPI4 254 as well as an item enabling the addressing port of the memory (MM) 100 to take into account or not take into account the high-order bit of the cell address word CAW 132.

Figure 9:
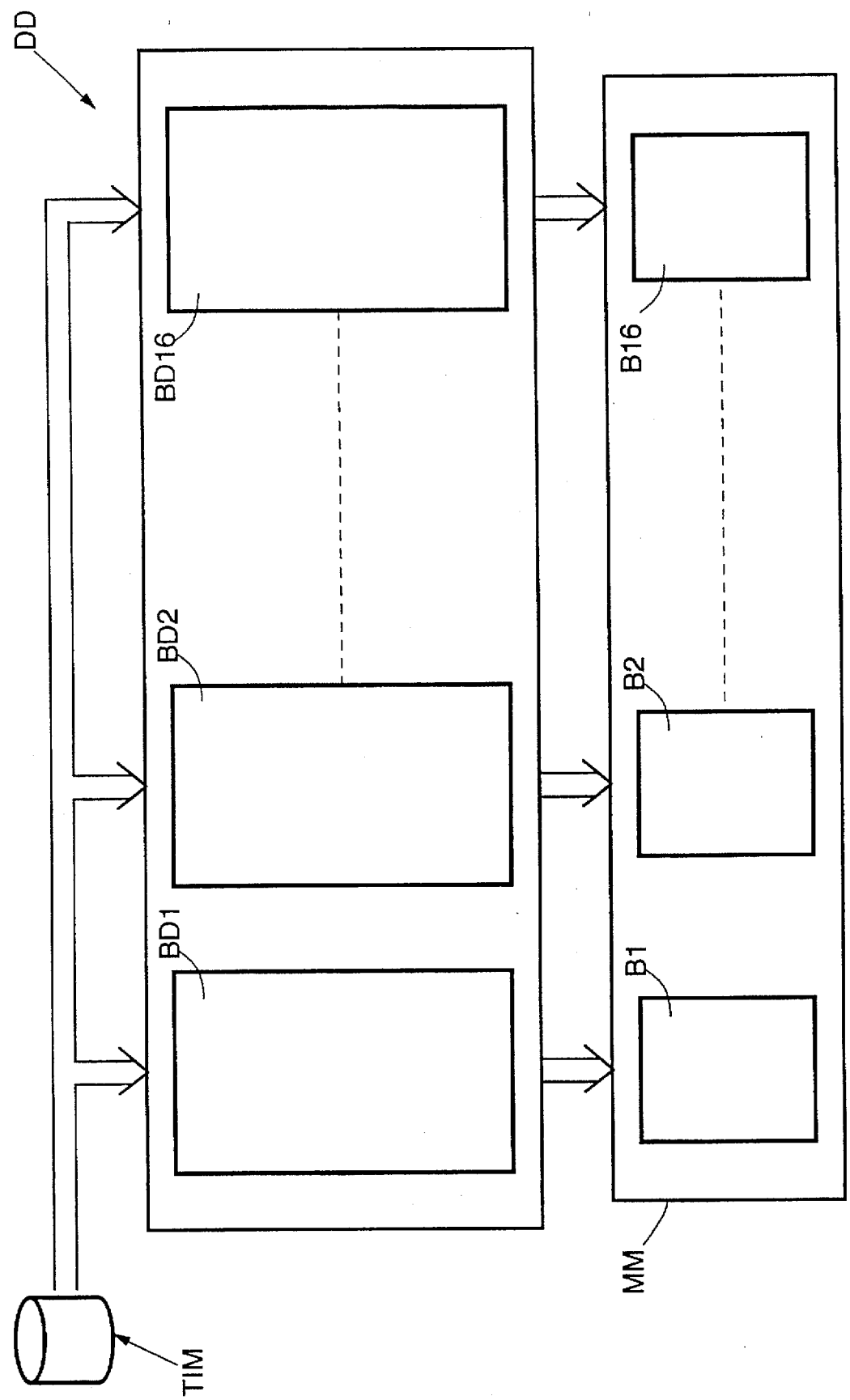
FIG. 9 is an overview representation of a device according to the invention applicable to simultaneous access to the various banks of the memory.

The device makes it possible, for each value of λ, to determine a conversion table ("skewing" table) (TIM) 300 associating with each point of the image the address (BAW) 130 of its bank in the memory. Thus, in the case where it is desired to access several data simultaneously, it is then appropriate for the device (DD) 106, such as illustrated in FIG. 9, to include as many blocks BD1–BD16 301–316 as memory banks B1–B16 81–96. The user will then choose, given the "skewing" table, to feed each of the blocks BD1–BD16 301–316 with points whose address in the image corresponds to distinct bank addresses.

The predetermined injective conversion law thus makes it possible to define a number of patterns of points which can be accessed in a single memory access cycle. However, even if the user decides to parameterize the device according to the invention with another value of k while preserving the same value of λ and hence the same law for converting address items into bank address words, he will be assured of preserving the infectivity of the conversion law by virtue of the determination according to the invention of the bits of each address word, and of avoiding conflicts of access to the various banks of the memory.

In the present case if the memory is not partitioned, the user will be able simultaneously to access patterns containing up to 16 points. However, it may be desirable to partition the memory into two independent blocks of 8 banks each, so as to be able simultaneously to access each of these two blocks via patterns of 8 points. However, these patterns of 8 points, certainly shorter, exhibit less important choice constraints as regards conflicts of access to similar banks. Stated otherwise, it will be possible to access at each cycle in each block a pattern containing up to 8 points without being concerned with the pattern accessed in the other block since the partition guarantees that there will never be any conflict between the two blocks.

In the embodiments just described, it was assumed that the memory was composed of a number p of banks equal to $2^b$ by using a linear "skewing" function of the type $X+\lambda Y$ modulo p. There could, however, be provision for using a prime number of banks of around $2^b$, for example 17 in the present case. Choosing p prime offers advantages as regards the patterns of points which can be accessed in a cycle. On the other hand, it does not allow the memory MM to be partitioned.

Figure 7:
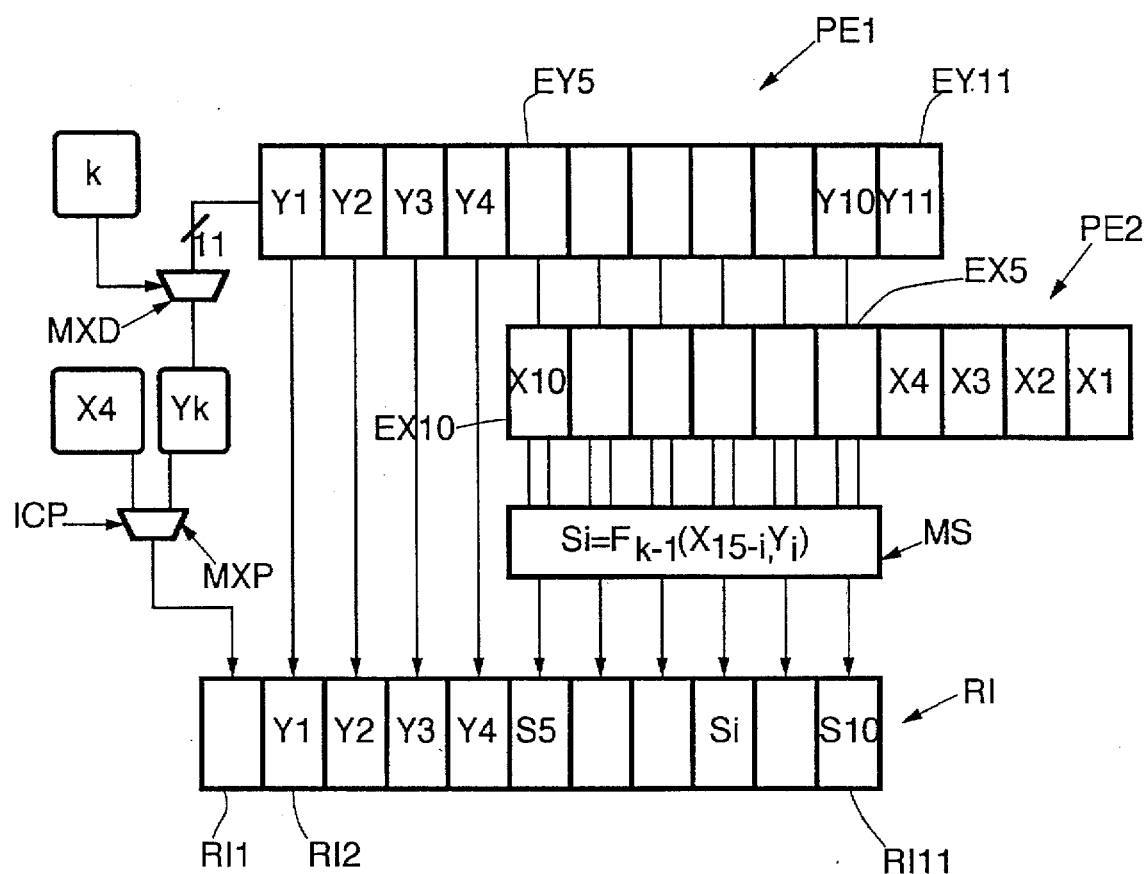

In the case where p=17, the bank address word of 5 bits is also calculated in accordance with the embodiment of FIG. 4 or FIG. 7. Thus injectivity is retained, even if surjectivity is lost since certain cells (in fact one in 17) of each memory block are unused, this not being prejudicial.

In all the embodiments just described it was assumed that the two directions in space were respectively the ordinate and abscissa axes, and that the first and second words were the addresses of the points along these two axes respectively. Of course, the device according to the invention is perfectly "symmetrical" in the sense that the first words could be associated with the abscissa axis and the second words with the ordinate axis. Furthermore, two other directions in the two-dimensional space of points may be chosen.

We claim:

1. Electronic memory addressing device, for a memory containing a useful memory space of M bits which can be configured as $2^n$ memory cells of D bits, each memory cell being addressable by a cell address word of n bits, comprising:

input means including a first input port and a second input port, the sum of whose inputs is greater than n, for receiving pairs of first words of k bits and of second words of n–k bits, each set of n bits representing an address item for a point of a two-dimensional space of points associated with data coded on D bits, the respective bits of the first and second words representing two coordinates (X, Y) of the point in the said space, a configuration input for receiving a value of k, chosen to be positive or zero and less than or equal to n, and representative of a geometrical configuration chosen for the two-dimensional space, addressing means which can be controlled through the value of k, including selection means for selecting the inputs of the first port receiving the k bits of each first word and the inputs of the second port receiving the n–k bits of each second word, and address generation means for forming, from the selected bits, a cell address word of n bits making it possible to address the memory cell in which the datum associated with the said point will be stored in such a way as to be able to address the same useful memory space on the basis of a dimensional space of different geometrical configurations, in particular a video image, wherein the memory is organized into banks, useful memory space includes at least $2^b$ banks of M bits with $b \geq 1$, the sum of the inputs of the two ports is greater than the sum s equal to n+b while k is chosen to be greater than or equal to b and less than or equal to s–b, and the addressing means are able to convert, according to a predetermined infective conversion law, each address item of a point into a memory address word including a cell address word and a bank address word representing, in the memory space, the address of the bank containing the said cell, and comprising selection means capable, in the presence of address item words of $s_1$ bits, with $s_1 = s$, of selecting the inputs of the first port receiving the k bits of each first word and the $s_1 - k$ bits of each second word in order to form an intermediate word of $s_1$ bits, and generation means capable of forming from the $s_1$ bits of the intermediate word, the cell address word of $n_1$ bits with $n_1 = n$ and the bank address word of at least b bits.

2. Device according to claim 1, wherein M is equal to $2^m$, and D is equal to $2^d$, n and d being positive integers or zero with sum equal to m.

3. Device according to claim 2, wherein the selection means are capable, in the presence of address item words of $s_1$ bits, with $s_1 =$ s–do bits, assigned to points whose corresponding data are coded on $2^{d+do}$ bits, of selecting the inputs of the first port receiving the k–do first bits of each first word and the $s_1$–k +do first bits of each second word to form the intermediate word of $s_1$ bits, the generation means forming, from the $s_1$ bits of the intermediate word, the cell address word of $n_1$ bits, with $n_1$=n–do, and the bank address word of at least b bits.

4. Device according to claim 3, wherein each input port includes $s_1$–b inputs and the selection means select the first bits of each of the first and second words, irrespective of the value of k, to form the intermediate word.

5. Device according to claim 4, wherein the generation means generate the cell address word from the first b bits (Y1–Y4) of one of the first and second words, and from the other $n_1$–b bits selected by the selection means and differing from the first b bits (X1–X4) of the other of the first and second words.

6. Device according to claim 1, wherein the generation means determine the bank address word from a linear relation modulo p between the two coordinates of the point, where p denotes the number of banks of the memory.

7. Device according to claim 6, wherein the number of banks p is equal to $2^b$ and the generation means determine the bank address word of b bits from the first b bits (Y1–Y4; X1–X4) of each of the first and second words.

8. Device according to claim 6, wherein the number of banks p is taken equal to a prime number greater than $2^b$, for example the first prime number greater than $2^b$.

9. Device according to claim 7, wherein the selection means are capable of substituting at least the highest addressing bit (Yk) of one of the first and second words by the $b^{th}$ bit (X4) of the other of the first and second words to form the intermediate word of $s_1$ bits, and the generation means then force the $b^{th}$ bit of the first word to a predetermined value.

10. Device according to claim 1, wherein the inputs of each port are ordered in such a way as to receive respectively the bits of the corresponding word, from the low-order bit up to the high-order bit, the selection means include duplexers connected to at least some of the inputs of the two ports, in such a way that the pairs of inputs of the duplexers thus connected are linked respectively to pairs of inputs (EYu, EXv) of the two ports having ranks (u, v) with constant sum (u+v), and the addressing means include control means capable of formulating, from the chosen value of k, control items for the duplexers thus connected.

11. Device according to claim 10, wherein each input port includes s−b inputs, the first inputs of controlled duplexers are connected respectively to the inputs of the first port of ranks b+1 to at most s−b−2 and the second inputs of the duplexers are connected respectively to the inputs of the second port of rank s−b−2 to b+1, the selection means select the first b bits of each of the first and second words, the bits delivered by the output of the controlled duplexers, and at least two other bits (G, H) selected, on the basis of a memory configuration state item, from the group formed by at least the two highest addressing bits of the first or of the second word, and at least the $b^{th}$ bit (X4) of one of the first and second words, and the generation means generate the cell address word from the first bits (Y1–Y4) of one of the first and second words, from the bits (S5–S9) delivered by the controlled duplexers, and from one at least of the said other two bits (G, H).

12. Device according to claim 11, wherein the input means include $2^b$ pairs of input ports intended for receiving respectively and simultaneously $2^b$ chosen address items corresponding to $2^b$ bank address words for distinct banks bearing in mind the predetermined injective conversion law, so as to be able simultaneously to access or to read a plurality of data whilst avoiding conflicts of access to identical banks.

13. Device according to claim 12, wherein the memory is partitioned into as many independent memory blocks as bits of the first word which are forced to a predetermined value.

14. Device according to claim 1, wherein the input means include $2^b$ pairs of input ports intended for receiving respectively and simultaneously $2^b$ chosen address items corresponding to $2^b$ bank address words for distinct banks bearing in mind the predetermined infective conversion law, so as to be able simultaneously to access or to read a plurality of data whilst avoiding conflicts of access to identical banks.

15. Device according to claim 14, wherein the memory is partitioned into as many independent memory blocks as bits of the first word which are forced to a predetermined value.

16. Electronic memory addressing device, for a memory containing a useful memory space of M bits which can be configured as $2^n$ memory cells of D bits, each memory cell being addressable by a cell address word of n bits, comprising:

input means including a first input port and a second input port, the sum of whose inputs is greater than n, for receiving pairs of first words of k bits and of second words of n−k bits, each set of n bits representing an address item for a point of a two-dimensional space of points associated with data coded on D bits, the respective bits of the first and second words representing two coordinates (X, Y) of the point in the said space, a configuration input for receiving a value of k, chosen to be positive or zero and less than or equal to n, and representative of a geometrical configuration chosen for the two-dimensional space, addressing means which can be controlled through the value of k, including selection means for selecting the inputs of the first port receiving the k bits of each first word and the inputs of the second port receiving the n−k bits of each second word, and address generation means for forming, from the selected bits, a cell address word of n bits making it possible to address the memory cell in which the datum associated with the said point will be stored in such a way as to be able to address the same useful memory space on the basis of a dimensional space of different geometrical configurations, in particular a video image, wherein the inputs of each port are ordered in such a way as to receive respectively the bits of the corresponding word, from the low-order bit up to the high-order bit, the selection means include duplexers connected to at least some of the inputs of the two ports, in such a way that the pairs of inputs of the duplexers thus connected are linked respectively to pairs of inputs (EYu, EXv) of the two ports having ranks (u, v) with constant sum (u+v), the addressing means include control means capable of formulating, from the chosen value of k, control items for the duplexers thus connected, wherein the memory is organized into banks, useful memory space includes at least $2^b$ banks of M bits with $b \geq 1$, the sum of the inputs of the two ports is greater than the sum s equal to n+b while k is chosen to be greater than or equal to b and less than or equal to s−b, and the addressing means are able to convert, according to a predetermined infective conversion law, each address item of a point into a memory address word including a cell address word and a bank address word representing, in the memory space, the address of the bank containing the said cell, and comprising selection means capable, in the presence of address item words of $s_1$ bits, with $s_1=s$, of selecting the inputs of the first port receiving the k bits of each first word and the $s_1-k$ bits of each second word in order to form an intermediate word of $s_1$ bits, and generation means capable of forming from the $s_1$ bits of the intermediate word, the cell address word of $n_1$ bits with $n_1=n$ and the bank address word of at least b bits.

* * * * *